3,415,266
POWER STEERING FLOW CONTROL DEVICE
Charles E. Brady, Bloomfield Hills, and Christopher Nuss, Warren, Mich., assignors to Chrysler Corporation, Highland Park, Mich., a corporation of Delaware
Filed Dec. 1, 1966, Ser. No. 598,426
10 Claims. (Cl. 137—117)

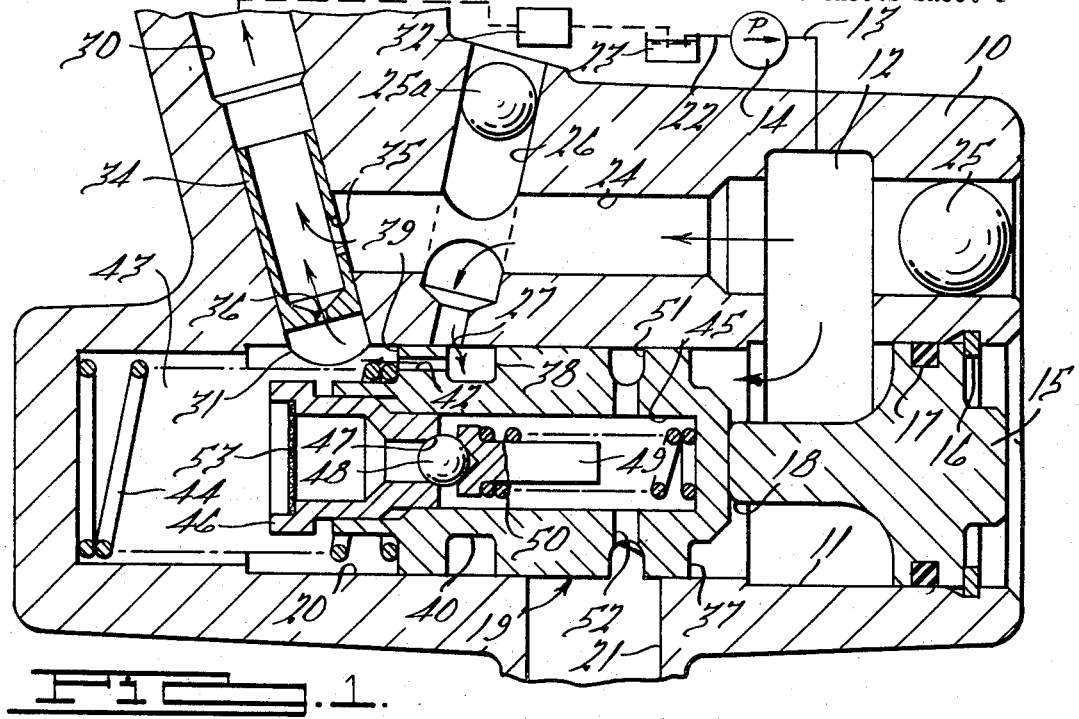

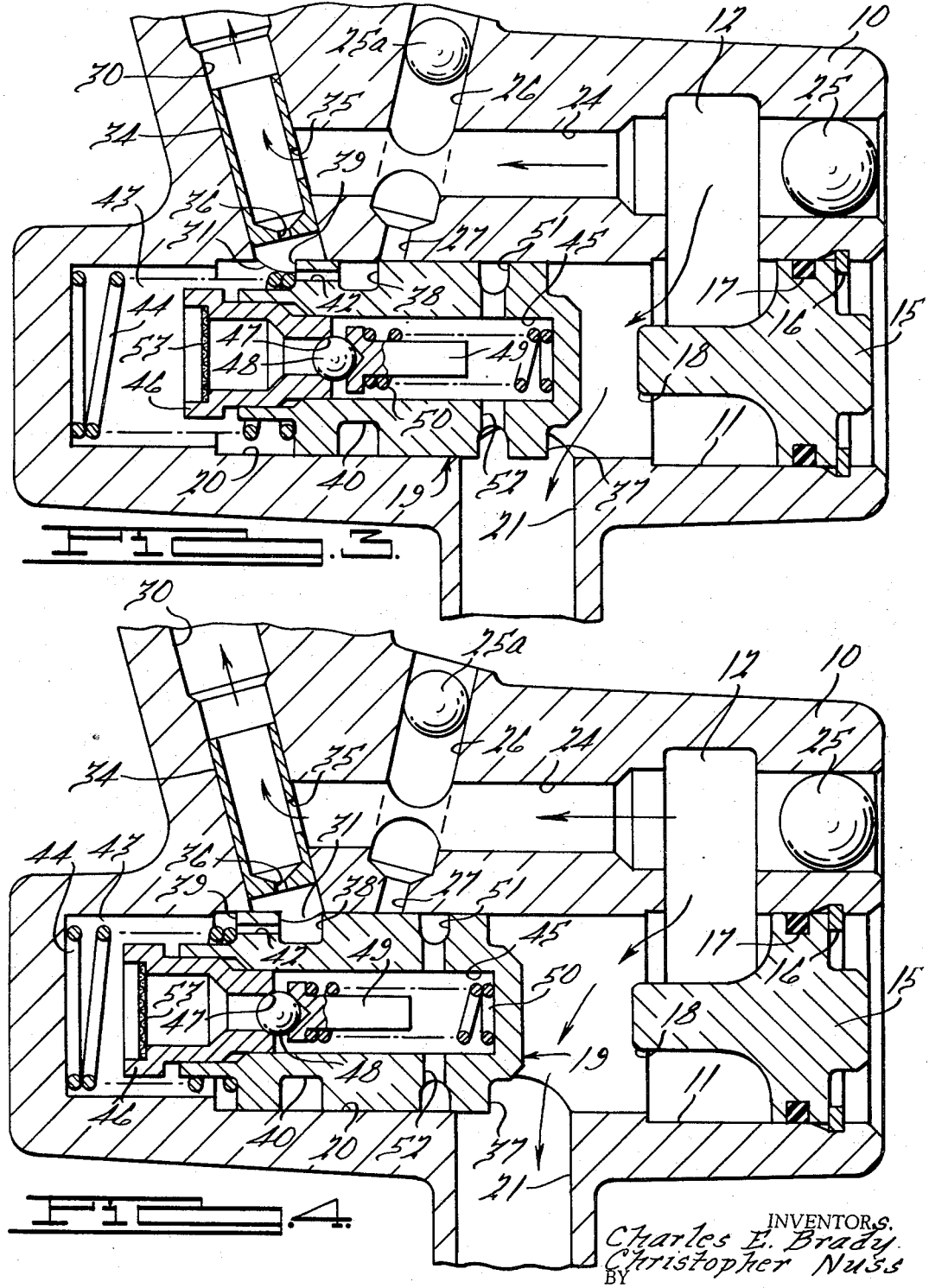

This invention relates to improvements in a fluid flow control device particularly adapted for use in metering the rate of flow of pressurized fluid to a hydraulically actuated power steering gear for an automobile and which in particular achieves a two stage flow control effective to reduce the pressurized flow to the steering gear at high vehicle engine speeds, in combination with a simple integral trigger action type pressure relief valve.

It is customary to supply pressurized fluid to an automobile power steering gear by means of a pump driven by the automobile engine, such that the pump is operated at maximum speed and is capable of delivering its maximum power when the automobile is cruising at high speed along the highways. The power steering gear on the other hand is ordinarily under maximum load and requires maximum power from the pump when the automobile is operating at low speeds, as for example during a parking maneuver. In order to minimize heating of the pressurized fluid, it has been customary to strive for a "drooper" effect in the rate of flow of the fluid to the steering gear, such that as the vehicle engine speed increases, the rate of flow of pressurized fluid decreases.

It is an object of the present invention to provide an improved flow control device of the above-mentioned type for an automotive steering gear which supplies pressurized fluid to the gear at a comparatively high constant rate of flow during engine operation at slow to moderate speeds, and at an appreciably reduced constant rate of flow during high speed engine operation.

With the advent of more powerful automobile engines and higher operating speeds, power steering pumps capable of supplying hydraulic fluid at pressures in the neighborhood of 800 to 1500 p.s.i. have become common for the sake of increased operating efficiency, reliability, and safety. The use of high pressure power steering pumps introduces various problems relating to noise in the hydraulic system and overheating of the pressurized fluid, which in turn necessitate more costly, precise, and complex parts, such as complex precision valves to minimize valve chattering and other noises, and costly flexible hose conduits capable of withstanding the high temperatures involved, by way of example.

Other objects are accordingly to provide a power steering flow control device of the above character which is particularly responsive to the steering load and which reacts rapidly to changes in the steering load, which is characterized by low friction in the fluid circuit, whereby frictional heating of the pressurized fluid is minimized, and which is of comparatively simple, compact construction susceptible of economical manufacture. thereby to avoid for example such complex and expensive structures as a metering rod and the difficulty of maintaining the same in concentric alignment with a metering orifice to obtain consistent flow control characteristics in mass produced valves.

Other objects are to provide such a flow control device having a sharp "drooper" or two stage action wherein the rate of flow of pressurized working fluid to the gear drops sharply above a predetermined engine speed, in combination with a particularly simple and economically manufactured trigger type pressure relief valve capable of operation at small volume above a predetermined high pressure to trigger large volume pressure relief operation of the flow control device and prevent development of excessive pressure in the system. By such a construction, a comparatively small economical pressure relief valve can be employed to discharge quietly a relatively small volume of hydraulic fluid at the predetermined high pressure, thereby to trigger operation of the larger and more costly flow control device which is capable of quietly and efficiently exhausting the entire fluid output of the power steering pump if desired.

Another and more specific object is to provide such a flow control device comprising a tubular valve bore in a valve housing having a pressure actuated spool valve shiftable axially therein and also having a valve port and a bypass port connected respectively with the high pressure pump outlet and low pressure pump inlet. Communication between the high pressure valve port and the bypass port is controlled by a bypass land on the valve spool, so as to provide a bypass flow to the pump inlet for the fluid output of the pump in excess of the requirements of the steering gear. The valve port opens into the valve bore at a location in communication with an upstream surface area of the valve spool to urge the latter in the direction of opening of the communication between the valve port and bypass port and in opposition to fluid pressure in communication with a downstream surface area of the valve spool.

A first of primary passage for working fluid has an upstream end in communication with the pump outlet and upstream surface area of the spool valve and has a delivery end in communication with both the steering gear to actuate the latter and with the downstream surface area of the spool valve. Metered fluid flow to the steering gear is provided through a first metering restriction located in the first passage between its upstream end and delivery end, whereby at least a portion of the fluid pressure differential across the first metering restriction is applied at all times to said upstream and downstream areas of the valve spool to actuate the latter. Valve biasing means cooperates with the fluid pressure at the downstream area of the valve spool to urge the latter in the direction to close the bypass flow from the pump outlet to the bypass port. Thus in a preferred embodiment of the invention where the effective upstream and downstream areas of the valve spool are equal, the pressure drop or differential across the first metering restriction will be a constant determined in part by the pressure exerted by the biasing means. Operation of the steering gear tending to vary this pressure differential will cause shifting of the spool valve to maintain the aforesaid pressure differential constant.

A restricted secondary metering passage for working fluid has its upstream and downstream ends in communication with the upstream end and delivery end respectively of the first passage, thereby to provide a restricted partial bypass around the first metering restriction during low speed operating conditions. In the latter regard, the secondary passage extends from the upstream end of the first passage to the latter's delivery end via a portion of the valve bore, whereby fluid flow in the secondary passage is controlled by a secondary land of the valve spool which restricts the secondary passage sharply when the pump output at low pressure exceeds a predetermined rate, i.e. at a predetermined high speed operation of the vehicle. Accordingly at the aforesaid high speed condition of operation, the flow of working fluid to the steering gear is reduced by an amount related to the extent that the flow in the secondary passage is reduced.

In a preferred embodiment, fluid pressure is communicated to the downstream area of the valve spool only by restricted orifice means, including a restricted trigger orifice connected with the delivery end of the first passage. A pressure relief valve also in communication with said down stream area is adapted to exhaust fluid pressure therefrom when the pressure transmitted thereto through the restricted orifice means exceeds a predetermined value, i.e., when the pressure at the steering gear reaches the upper limit for safety. It is apparent that when the relief valve exhausts a small volume of comparatively incompressible hydraulic fluid from the region in communication with the downstream surface area, the flow through the restricted orifice means will result in a comparatively large pressure loss at the downstream area and a corresponding movement of the spool valve to increase the communication between the pump outlet and bypass port. Thus a slight fluid flow through the pressure relief valve will efficiently trigger a comparatively large bypass flow from the pump outlet and prevent an unsafe high pressure in the system.

Other specific objects are to provide the trigger orifice in series with and downstream of a secondary restriction in the restricted secondary passage and in the flow of fluid through the secondary passage into the delivery end of the first passage, to connect the downstream area of the spool valve with the secondary passage at a location between said trigger orifice and secondary restriction, and to locate the pressure relief valve within an axial bore of the spool valve which is connected at one end with the pressure at the downstream area of the spool valve and which is connected at its opposite end with the bypass port, the pressure relief valve comprising a simple spring loaded ball check valve normally blocking communication between the opposite ends of the axial bore until the upper safe limit of pressure is attained at said downstream area.

Other objects of this invention will appear in the following description and appended claims, reference being had to the accompanying drawings forming a part of this specification wherein like reference characters designate corresponding parts in the several views.

FIG. 1 is a schematic view of the present invention, showing the flow control device in an operating condition corresponding to the minimum engine idle speed.

FIG. 2 is a view similar to FIG. 1, showing the bypass port partially open at an operating condition corresponding to moderate engine cruising speeds.

FIG. 3 is a view similar to FIG. 1, showing the secondary passage closed at an operating condition corresponding to high speed engine operation.

FIG. 4 is a view similar to FIG. 1, showing the bypass port wide open and the secondary passage closed at an operating condition corresponding to nearly maximum engine speed.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in particular to FIGURES 1–4, a preferred embodiment of the invention is illustrated by way of example in a flow control device for an automotive power steering gear. A cast housing 10 provides a valve bore 11 in communication at its upstream end with a valve port 12, which in turn is connected with the outlet 13 of a high pressure engine driven hydraulic pump 14 for receiving pressurized fluid therefrom. The bore 11 extends into the housing 10 from one end which is sealed by a closure 15 retained in place by a C-ring 16 partially embedded in the housing side wall. A seal 17 around the periphery of the closure 15 prevents endwise leakage of fluid from the housing 10. Extending inwardly as an integral portion of the closure 15 is a stop 18 adapted to limit rightward movement of a valve spool 19 shiftable axially within a smooth cylindrical portion 20 of the bore 11.

A bypass port 21 opens into the bore portion 20 near its upstream end and is preferably connected with the inlet 22 of the pump 14 for supercharging the inlet flow into the latter from a fluid reservoir 23 in accordance with conventional practice. A first or primary passage 24 for pressurized working fluid is bored into the housing 10 through the valve port 12 to communicate with the latter and to receive the pressurized output fluid from the pump 14. The open end of the bore 24 in the housing 10 is sealed by a spherical closure 25 tightly pressed therein.

A second bore 26 in the housing 10 intersects the bore 24 downstream of the valve port 12 and communicates with the valve bore 20 at a secondary port 27, the outer end of bore 26 being closed by a spherical plug 25a. A delivery passage 30 is bored into the housing 10 to intersect bore 24 and also to communicate with valve bore 20 at a delivery port 31 downstream of the secondary port 27. The delivery passage 30 extends to the hydraulic motor 32 of the power steering gear to supply pressurized working fluid thereto in a conventional manner, the exhaust fluid from the motor 32 being discharged into the reservoir 23 as indicated. A tubular insert 34 coaxially within bore 30 has a restricted lateral primary metering orifice 35 opening into bore 24 and also has a restricted metering or trigger orifice 36 which opens axially into port 31.

The valve spool 19 is provided with an annular bypass land 37 at its upstream end for controlling the communication between the valve port 12 and bypass port 21 in accordance with axial shifting of the spool 19 as described below. Similarly a second annular land 38 of the spool 19 controls the opening of the secondary port 27 into the valve bore 20. An annular third or guide land 39 spaced from the land 38 by an annular recess 40 serves as a guide for the spool 19 in bore 20 and is provided with a restricted secondary orifice 42 extending axially therethrough into a downstream chamber portion 43 of the bore 11. A valve biasing spring 44 seated at its opposite ends against the closed end of bore 11 and the guide land 39 urges the spool 19 rightward against the stop 18 with a substantially constant force within the range of movement permitted.

It is apparent from the construction shown that the high pressure directed against the upstream end surface area of the spool valve 19 is balanced by the combined forces of the spring 44 and the pressure in the downstream chamber 43 against the downstream end surface area of the spool 19, such that a constant pressure differential across orifice 42 is maintained, as determined by the pressure of spring 44, as long as port 27 is not restricted by land 38. In the event that the pressure differential across orifice 42 tends to vary, the valve spool 19 will shift correspondingly to increase or decrease the communication of bypass 21 with the valve port 12. In consequence of the constant pressure differential across metering restriction or orifice 42, the fluid flow therethrough will be constant. This same constant flow must exist through restricted orifice 36, so that the pressure differential across orifice 36 must also remain constant. Therefore, the pressure differential across metering orifice 35, which equals the sum of the pressure differentials across restricted orifices 42 and 36, is constant and a constant flow of working fluid into the delivery passage 30 and to the motor 32 will be supplied at all times during operation of the pump at moderate engine speeds as described below regardless of the pressure in passage 30 determined by the power demands of the motor 32. It is also to be noted that a secondary restricted passage through port 27, restriction or orifice 42, port 31, and restricted trigger orifice 36 provides a limited bypass flow of the working fluid around the restriction 35 into delivery passage 30 during operation at moderate engine speeds, i.e., when port 27 is open.

In a typical power steering gear the combined flow through restrictions 35 and 36 will be in the neighborhood of approximately 2.7 gals. per minute when port 27 is open as in FIGURES 1 and 2. The excess pump output will be bypassed into port 21 upon leftward shifting of valve spool 19. During high speed operation of the vehicle engine and increased pump output as illustrated in FIGURES 3 and 4, port 27 is closed by land 38 upon leftward movement of spool valve 19. Thus at high vehicle speeds ordinarily above 60 m.p.h. when the power requirements of the motor 32 are at a minimum, the flow of working fluid into delivery passage 30 is reduced sharply to approximately 1.5 gals. per minute by the closing of the secondary passage through port 27. During the operation described thus far, the restricted orifices 42 and 36 effect a dash-pot action to damp sudden valve movements.

In order to prevent the development of an unsafe pressure in the delivery conduit or passage 30 in the event of an excessive power demand by the motor 32, a fluid pressure relief system is provided comprising a coaxial bore 45 in the spool 19, which opens into chamber 43. A tubular valve insert 46 secured within the open end of bore 45 is provided with an annular valve seat 47 at its inner end for a ball check valve 48. The latter is maintained in a seated position against the seat 47 to close the bore 45 by means of a spring retainer 49 urged leftward against the ball 48 by a spring 50 seated under compression against a flange of the retainer 49 and the closed right end of bore 45. An annular recess 51 in the outer periphery of spool 19 communicates with the bypass port 21 and is in turn connected with the bore 45 by a plurality of radial bores 52 to discharge fluid from the chamber 43 into bypass port 21 upon opening or unseating of valve 48 against the force of spring 50 in response to pressure at an upper limit in chamber 43.

Upon the unseating of valve 48, a small quantity of fluid will be discharged into bypass 21 through bore 45. By virtue of the restriction of trigger orifice 36 and secondary metering orifice 43, the pressure in downstream chamber 43 will be immediately reduced to enable leftward shifting of valve spool 19, thereby to increase the opening of bypass port 21. In consequence, a comparatively insignificant fluid flow around check valve 48 can result in a comparatively large rate of increase in the bypass flow around land 37 whereby a comparatively simple and economical ball valve 48 may be feasibly employed without inducing an undesirable valve noise during pressure relief operation that would otherwise result if the entire pressure relief flow were passed through the pressure relief valve. Also in the structure just described, the trigger orifice 36 and metering orifice 42 open into chamber 43 in parallelism with each other, so that slight pressure variations in the system are readily communicated to and from chamber 43 and a rapidly responsive valve operation is assured.

Having thus described our invention, we claim:
1. In a power steering system,
(A) a pump having an inlet and an outlet,
(B) first working fluid passage means having an upstream end in communication with said outlet for receiving working fluid therefrom and having a delivery end for supplying said working fluid to a hydraulic motor,
(C) means for metering the flow of said working fluid to said delivery end including
 (1) first metering restriction means in said working fluid passage means for metering the flow of working fluid therein and
 (2) valve controlled secondary fluid passage means for said working fluid having upstream and downstream ends in communication with said working fluid passage means at locations upstream and downstream respectively of said first metering restriction means for partially bypassing the latter,
 (3) flow restricting means in said secondary passage means for metering the flow of working fluid therein including
  (a) secondary metering orifice means and
  (b) trigger metering orifice means in series with said secondary metering orifice means and downstream thereof,
(D) means for exhausting excess fluid from said outlet comprising
 (1) a bypass port,
(E) means cooperable with said metering restriction means for maintaining a substantially constant rate of flow of working fluid to said delivery end when the output of said pump is less than a predetermined value comprising
 (1) pressure actuated flow control valve means responsive to the fluid output of said pump for controlling the communication between said outlet and bypass port and having
  (a) an upstream surface area in communication with the fluid pressure at said pump outlet and responsive thereto for actuating said flow control valve means to increase the communication between said pump outlet and bypass port, and
  (b) a downstream surface area responsive to fluid pressure thereat for opposing the pressure at said upstream surface area and actuating said flow control valve means to decrease the communication between said pump outlet and bypass port,
(F) means comprising part of said flow control valve means for reducing the flow of working fluid to said delivery end to less than said substantially constant rate when said pump output exceeds said predetermined value comprising
 (1) secondary fluid flow control means for restricting said secondary passage means when said pump output exceeds said predetermined value,
(G) means for communicating the pressure in said secondary passage means at a location between said secondary metering orifice means and trigger metering orifice means to said downstream surface area, and
H) pressure relief valve means responsive to a predetermined fluid pressure at said downstream surface area for discharging fluid therefrom to reduce the pressure thereat, thereby to enable actuation of said flow control valve means to increase the communication between said pump outlet and bypass port.

2. In a power steering system according to claim 1, said secondary metering orifice means including a metering orifice in a portion of said flow control valve means.

3. In the combination according to claim 1, a housing having a valve chamber therein, said flow control valve means comprising a pressure actuated valve element in said chamber, said valve element having said upstream and downstream surface areas and being responsive to the fluid pressures thereat for controlling the communication between said pump outlet and bypass port, a valve port in communication with said pump outlet to receive pressurized fluid therefrom and opening into said chamber in communication with said upstream surface area to apply the pressure of said fluid thereto, said bypass port opening into said chamber to receive said fluid therefrom and said chamber comprising a portion of said secondary passage means and having an upstream secondary port in communication with said upstream end of said secondary passage for conducting fluid therefrom into said chamber, said secondary fluid flow control means comprising a portion of said valve element operable in response to said pump output in excess of said predetermined value for restricting said upstream secondary port.

4. In a power steering system according to claim 3, said delivery end having a bore portion, a tubular insert in said bore portion having a first restricted orifice therein comprising said first metering restriction means and having a restricted trigger orifice therein comprising said trigger metering orifice means.

5. In the combination according to claim 3, said valve element having a portion located in the part of said chamber comprising said portion of said secondary passage means and providing said secondary metering orifice means and otherwise blocking communication between said upstream secondary port and said trigger metering orifice means.

6. In the combination according to claim 3, said chamber comprising a valve bore having said bypass port and secondary port opening thereinto, said valve element comprising a spool valve element shiftable axially in said valve bore and having a first land controlling the communication between said valve port and bypass port and also having a second land controlling the opening of said upstream secondary port into said valve bore.

7. In the combination according to claim 6, said delivery end having a bore portion, a tubular insert coaxially in said bore portion having a first restricted orifice in its sidewall and comprising said first metering restriction means and having an axially opening restricted trigger orifice at its upstream end comprising said trigger metering orifice means.

8. In the combination according to claim 6, said spool valve element having a third land located downstream of said secondary port in the part of said chamber comprising said portion of said secondary passage means and blocking communication between said secondary port and trigger metering orifice means, and a restricted secondary metering orifice extending axially through said third land and comprising said secondary metering orifice means.

9. In the combination according to claim 6, said spool valve element having an axial bore therein opening endwise in communication with the pressure at said downstream surface area, a fluid discharge port in said valve element connecting the last-named valve bore and said bypass port, and said pressure relief valve being located in said last-named valve bore to control the communication between said bypass port and the pressure at said downstream surface area.

10. In the combination according to claim 9, said delivery end having a bore portion, a tubular insert coaxially in said bore portion having a first restricted orifice in its sidewall and comprising said first metering restriction means and having an axially opening restricted trigger orifice at its upstream end comprising said trigger metering orifice means.

References Cited

UNITED STATES PATENTS

| | | | |
|---|---|---|---|
| 3,145,734 | 8/1964 | Lee et al. | 137—117 XR |
| 3,234,957 | 2/1966 | Allen | 137—117 |
| 3,314,495 | 4/1967 | Clark et al. | 137—117 XR |
| 3,320,968 | 5/1967 | Nuss | 137—117 |
| 3,349,714 | 10/1967 | Grenier | 137—117 XR |

JOHN PETRAKES, *Primary Examiner.*

U.S. Cl. X.R.

134—497